(12) United States Patent
Kang

(10) Patent No.: US 9,994,115 B2
(45) Date of Patent: Jun. 12, 2018

(54) BATTERY PACK REPLACEMENT SYSTEM FOR ELECTRIC VEHICLE WITH ENERGY STORAGE SYSTEM

(71) Applicant: Byung Hyouk Kang, Cheonan-si (KR)

(72) Inventor: Byung Hyouk Kang, Cheonan-si (KR)

( * ) Notice: Subject to any disclaimer, the term of this patent is extended or adjusted under 35 U.S.C. 154(b) by 23 days.

(21) Appl. No.: 15/101,728

(22) PCT Filed: Feb. 27, 2014

(86) PCT No.: PCT/KR2014/001609
§ 371 (c)(1),
(2) Date: Jun. 3, 2016

(87) PCT Pub. No.: WO2015/083898
PCT Pub. Date: Jun. 11, 2015

(65) Prior Publication Data
US 2016/0303988 A1   Oct. 20, 2016

(30) Foreign Application Priority Data

Dec. 3, 2013   (KR) .................. 10-2013-0149020

(51) Int. Cl.
*H02J 7/00* (2006.01)
*B60L 11/18* (2006.01)
(Continued)

(52) U.S. Cl.
CPC ............. *B60L 11/1822* (2013.01); *B60L 3/12* (2013.01); *B60L 11/1824* (2013.01);
(Continued)

(58) Field of Classification Search
CPC .............. B60L 11/1822; B60L 11/1846; Y02T 10/7061; Y02T 90/124; Y02T 90/169
(Continued)

(56) References Cited

U.S. PATENT DOCUMENTS

| | | | |
|---|---|---|---|
| 2009/0198372 A1* | 8/2009 | Hammerslag | B60L 11/1822 700/226 |
| 2012/0013302 A1 | 1/2012 | Genzel et al. | |
| 2014/0002019 A1* | 1/2014 | Park | B60L 11/00 320/109 |

FOREIGN PATENT DOCUMENTS

| | | |
|---|---|---|
| JP | 2001-057711 A | 2/2001 |
| JP | 2010-173365 A | 8/2010 |

(Continued)

*Primary Examiner* — Edward Tso
*Assistant Examiner* — Aaron Piggush
(74) *Attorney, Agent, or Firm* — Novick, Kim & Lee, PLLC; Jae Youn Kim

(57) ABSTRACT

Disclosed herein are a battery pack replacement system for an electric vehicle with an Energy Storage System (ESS) and a method of managing and replacing a battery pack using the same. A system equipped with a replacement system for replacing a battery pack of an electric vehicle and an ESS includes a determination unit for determining the type of battery pack of the vehicle, a replacement unit for detaching a discharged battery pack from the vehicle or mounting a battery pack on the vehicle, a charging/discharging unit for charging/discharging and storing the discharged battery pack, and a transfer unit for conveying the discharged battery pack, detached from the replacement unit, to the charging/discharging unit or conveying the battery pack, fully charged by the charging/discharging unit, to the replacement unit.

11 Claims, 12 Drawing Sheets

(51) Int. Cl.
*B60L 3/12* (2006.01)
*B65G 25/06* (2006.01)
(52) U.S. Cl.
CPC ....... *B60L 11/1846* (2013.01); *B60L 11/1861* (2013.01); *B60L 11/1864* (2013.01); *B65G 25/06* (2013.01); *B60L 2240/547* (2013.01); *Y02T 10/7005* (2013.01); *Y02T 10/7044* (2013.01); *Y02T 10/7061* (2013.01); *Y02T 10/7072* (2013.01); *Y02T 90/121* (2013.01); *Y02T 90/124* (2013.01); *Y02T 90/128* (2013.01); *Y02T 90/14* (2013.01); *Y02T 90/163* (2013.01); *Y02T 90/169* (2013.01); *Y04S 30/14* (2013.01)
(58) Field of Classification Search
USPC ................................ 320/104, 106, 109, 113
See application file for complete search history.

(56) References Cited

FOREIGN PATENT DOCUMENTS

| | | |
|---|---|---|
| JP | 2012-040935 A | 3/2012 |
| KR | 10-2012-0124253 A | 11/2012 |
| KR | 10-2013-0071923 A | 7/2013 |

\* cited by examiner

"PRIOR ART"

BATTERY PACK REPLACEMENT SYSTEM FOR ELECTRIC VEHICLE WITH ENERGY STORAGE SYSTEM

BACKGROUND OF THE INVENTION

Technical Field

The present invention relates to a system for replacing a battery pack for an electric vehicle and, more particularly, to an battery pack replacement system for an electric vehicle with an ESS, wherein a discharged battery pack of an electric vehicle is replaced with a charged battery pack and a plurality of battery packs is separately stored for replacement and for storage.

Description of the Related Art

As global warming is accelerated, a weather disaster is generated and life is endangered by a serious climate change. Strong control on carbon dioxide is globally spoken with one voice. The auto industry has entered a new phase in accordance with such environmental and social requests. There is a growing interest in an eco-friendly vehicle capable of minimizing the discharge of exhaust gas that is discharged from an internal combustion engine vehicle.

Such an eco-friendly vehicle may be classified into a Hybrid Electric Vehicle (HEV) in which an internal combustion engine and electric power are combined and used, an Electric Vehicle (EV) using only electric power, and a Fuel Cell Electric Vehicle (FCEV) using a fuel cell, depending on their power sources.

In line with a worldwide trend toward a reduction of the discharge of carbon dioxide, in Korea, it is expected that the demand and supply of electric vehicles will be suddenly increased due to the mass production of electric vehicles.

Furthermore, an electric vehicle, such as a Plug-in-Hybrid Electric Vehicle (PHEV), has advantages of low energy consumption and low air pollution. In particular, such an electric vehicle plays an important role in solving environmental pollution and energy reduction problems in the paradigm of a smart grid. As electric vehicles are suddenly used, active research has been carried out on the influence of a load of an electric vehicle on a power grid.

A conventional charging system for an electric vehicle, as shown in FIG. 1, includes a battery pack 10 configured to have a plurality of cells connected thereto depending on necessary electric power, a voltage measurement unit 11 configured to measure voltage of the battery pack 10, a Battery Management System (BMS) 12 configured to uniformly maintain a voltage difference between the cells of the battery pack 10 and a charging circuit 13 configured to convert commercial power into power that can be charged.

The conventional charging system for an electric vehicle was developed to simply charge a battery, but the charging system has rarely been researched for the purpose of replacing a battery pack.

Apart from the charging system, active research is being carried out on an Energy Storage System (ESS) in preparation for a short power supply condition. An ESS is a system for storing power excessively generated from a power plant and supplying the stored power when power is temporarily insufficient. An ESS is suddenly emerging as a scheme for efficiently utilizing a current electric power generation system.

However, research on the battery pack replacement system and research on the ESS for an electric vehicle are separately carried out. Accordingly, there is a need for integrated research on a battery pack replacement system and an ESS based on the same category in which charging is performed by supplying the power battery pack replacement system and the ESS.

SUMMARY OF THE INVENTION

Accordingly, the present invention has been made keeping in mind the above problems occurring in the prior art, and an object of the present invention is to provide a battery pack replacement system for an electric vehicle with an ESS, wherein a plurality of battery packs is charged and stored, a discharged battery pack of an electric vehicle is replaced with a charged battery, power is stored through the plurality of stored battery packs, and a vehicle can be driven within a shorter time as compared with a conventional charging method through the replacement of battery packs.

In accordance with an aspect of the present invention, a system equipped with a replacement system for replacing a battery pack 100 for an electric vehicle and an Energy Storage System (ESS) includes a determination unit for determining the type of battery pack 100 of the vehicle, a replacement unit for detaching a discharged battery pack 100 from the vehicle or mounting a battery pack on the vehicle, a charging/discharging unit for charging/discharging and storing the discharged battery pack 100, and a transfer unit for conveying the discharged battery pack, detached from the replacement unit, to the charging/discharging unit or conveying the battery pack 100, fully charged by the charging/discharging unit, to the replacement unit.

Furthermore, the determination unit includes a photographing device 200 configured to include CCTV or a reading camera for photographing the vehicle and to determine the type of battery pack 100 by reading a car model and a determination device configured to determine a car model and the type of battery pack 100 using data received from the photographing device 200. Alternatively, the determination unit includes a determination unit installed on the lower part of the vehicle and configured to determine the type of battery pack 100 using data received through barcode, Bluetooth, or a sensor attached to the battery pack 100 depending on the type of battery pack 100.

Furthermore, the replacement unit includes a replacement device 300 configured to include a replacement tool for replacing the discharged battery pack 100 in the vehicle and a first conveyance device 310 configured to transfer the discharged battery pack 100, mounted on the replacement tool, to the transfer unit and transfer the fully charged battery pack 100, taken over from the transfer unit and mounted on the replacement tool, to a position on which the fully charged battery pack 100 is to be mounted.

Here, the transfer unit includes a first transfer device 400 configured to move up and down and transfer the discharged battery pack 100, taken over from the replacement unit, to a storage unit and a second transfer device 410 configured to transfer the fully charged battery pack 100, taken over from the storage unit, to the transfer unit. The first transfer device 400 transfers the discharged battery pack 100, delivered by the first conveyance device 310, to the storage unit.

Furthermore, the storage unit includes a second conveyance device 500 configured to store the battery pack 100 depending on the type of battery pack 100 and take over the transfer unit from the discharged battery pack 100, a third conveyance device 510 configured to take over the discharged battery pack 100 from the second conveyance device 500, store the discharged battery pack 100, and transfer the discharged battery pack 100 to the second conveyance device 500, and a charging/discharging device 530 configured to charge the discharged battery pack 100 transferred to the third conveyance device 510.

Furthermore, the storage unit further includes a transfer device 520 configured to transfer the discharged battery pack 100 from the second conveyance device 500 to the third conveyance device 510 or transfer the fully charged battery pack 100, stored in the third conveyance device 510, to the second conveyance device 500.

Furthermore, the second conveyance device 500 transfers the discharged battery pack 100 from the first transfer device 400 to the third conveyance device 510 and transfers the fully charged battery pack 100, stored in the third conveyance device 510, to the second transfer device 410.

Furthermore, the first conveyance device 310 moves a belt or chain on which the replacement device 300 is mounted to a power source, and the second and the third conveyance devices 500 and 510 move a belt or chain on which the battery pack 100 is mounted to the power source.

Here, the charging/discharging device 530 includes a charging/discharging connector 531 configured to include a second plug 532 connected to the first plug 101 of the battery pack 100, a discharging feeding circuit and a charging feeding circuit configured to rapidly discharge and then rapidly charge the discharged battery pack 100 through the charging/discharging connector 531, and an inverter configured to convert commercial power into power for charging. The discharging feeding circuit and the charging feeding circuit and the charging/discharging connector 531 are electrically connected in the third conveyance device 510.

Furthermore, the first plug 101 and the second plug 532 have a taper shape and a round shape, respectively, or a round shape and a taper shape, respectively. The charging/discharging device 530 further includes a battery pack lock 530 for fixing the battery pack 100.

Furthermore, the charging/discharging device 530 determines whether to use the battery pack 100 as a buffer battery pack 110 that replaces the discharged battery pack 100 or as an ESS-dedicated battery pack 120 that is charged and stored depending on a buffer capacity of the battery pack 100. A plurality of reference holes 102 for connecting the first plug 101 and the second plug 532 is formed in front and rear parts of the battery pack 100.

In accordance with the present invention, a plurality of battery packs is charged and stored, a discharged battery pack is replaced with a stored charged battery pack, and the replaced charged battery pack is mounted on a vehicle. Accordingly, there are advantages in that the method of the present invention can replace a conventional method in which a driver directly charges and replaces a battery pack, a safety accident that may occur when a battery pack is directly charged can be reduced, and time can be reduced because the time taken to replace a discharged battery pack is shorter than the time taken to directly charge a discharged battery pack.

Furthermore, battery packs are classified into a buffer battery pack having a buffer capacity of about 70% or more and an ESS-dedicated battery pack having a buffer capacity of less than about 70%. If the buffer capacity of a buffer battery pack is lowered, the buffer battery pack is classified as an ESS-dedicated battery pack. Accordingly, there is an advantage in that a buffer battery pack having a lower buffer capacity can be reused without being discarded.

Furthermore, there is an advantage in that a driver's convenience is improved because battery packs are automatically replaced in the state in which the driver has not gotten off a vehicle.

BRIEF DESCRIPTION OF THE DRAWINGS

The accompanying drawings described below show exemplary embodiments of the present invention for the purpose of assisting understanding of the present invention with the detailed description of the embodiments. The drawings should not be interpreted to limit the present inventions in any aspect.

DESCRIPTION OF REFERENCE NUMERALS OF PRINCIPAL ELEMENTS IN THE DRAWINGS

Figure 1:
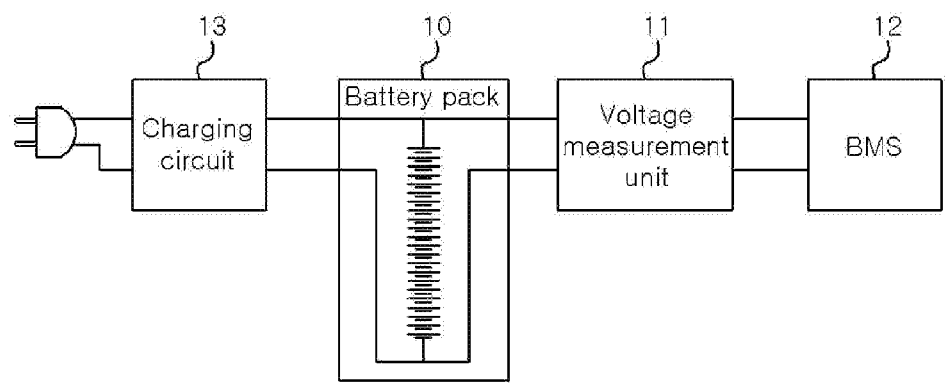
FIG. 1 is a diagram schematically showing a conventional system for charging the battery of an electric vehicle.

100: battery pack
101: first plug
102: reference holes
110: battery pack for battery
120: ESS-dedicated battery pack
200: photographing device
300: replacement device
310: first transfer device
400: first transfer device
410: second conveyance device
500: second conveyance device
510: third conveyance device
520: transfer device
530: charging/discharging device
531: charging/discharging connector
532: second plug
533: battery pack lock

DETAILED DESCRIPTION

Hereinafter, some exemplary embodiments of the present invention are described in detail with reference to the accompanying drawings in order for those skilled in the art to be able to readily practice them. In describing an operational principle relating to the embodiments of the present invention, however, when a detailed description of relevant functions or constructions is deemed to make the subject matter of the present invention unnecessarily obscure, the detailed description will be omitted.

Figure 2:
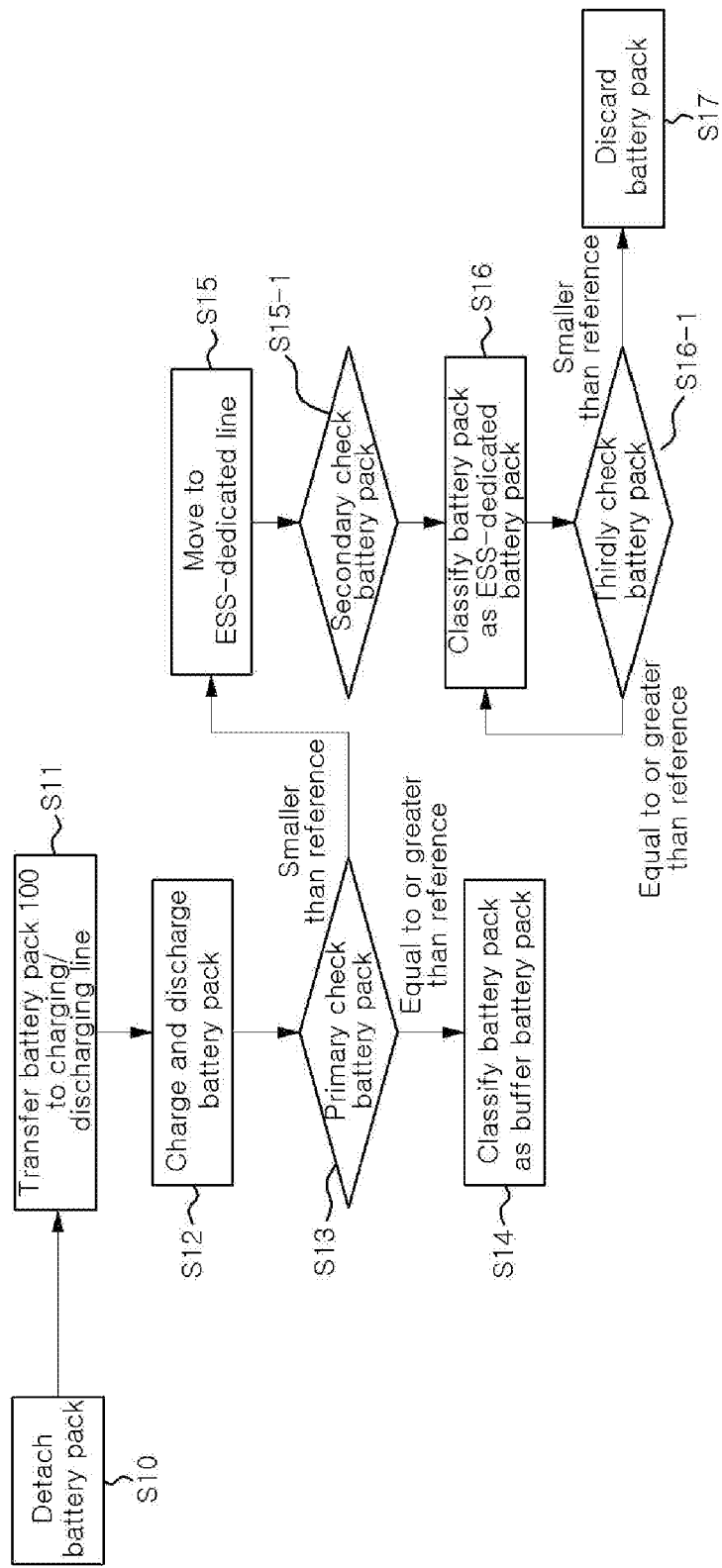
FIG. 2 is a process diagram schematically showing a battery replacement system for an electric vehicle with an ESS in accordance with an exemplary embodiment of the present invention.
Figure 3:
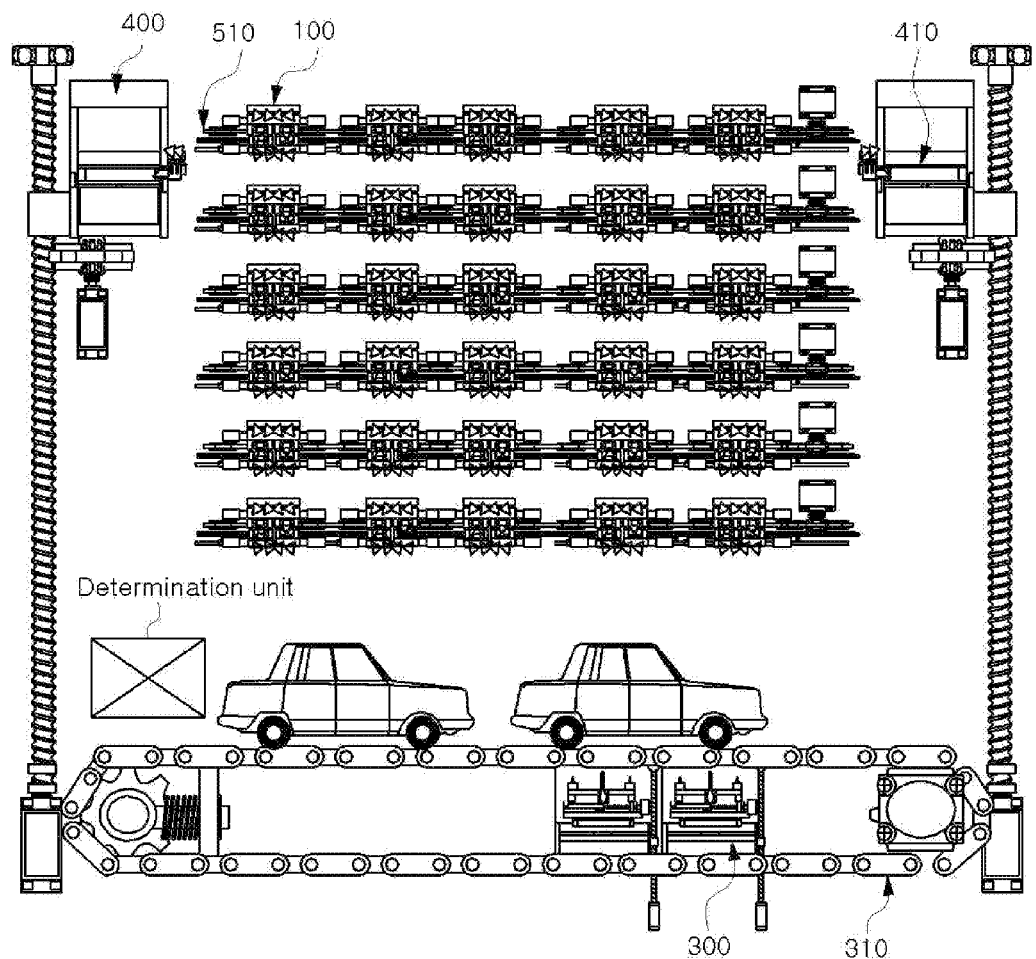
FIG. 3 is a side view schematically showing the side of an apparatus for implementing the replacement and charging of a battery in the battery replacement system of FIG. 2.
Figure 4:
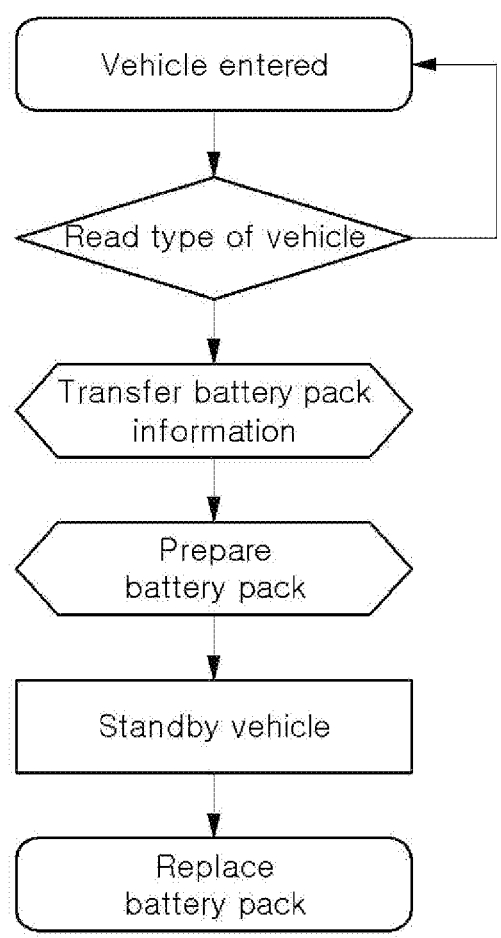
FIG. 4 a process diagram for checking a vehicle that enters the battery replacement system of FIG. 3.
Figure 5:
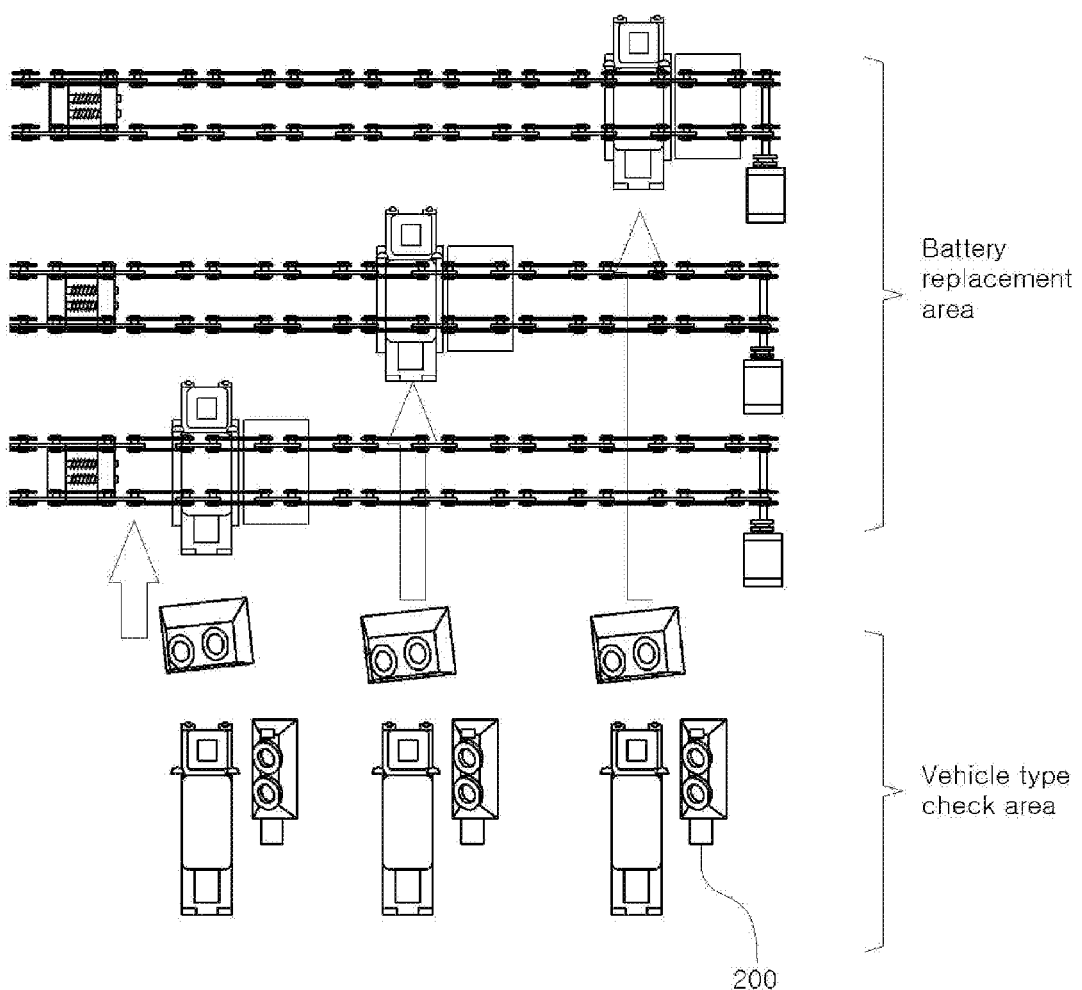
FIG. 5 is a diagram for implementing the process diagram of FIG. 4.
Figure 6:
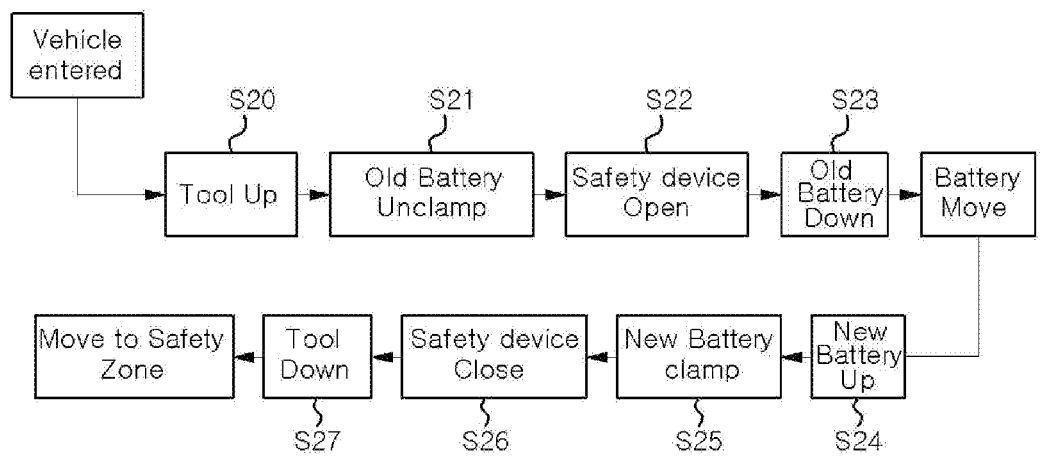
FIG. 6 is a process diagram for replacing the battery of a vehicle that has entered the battery replacement system of FIG. 3.
Figure 7:
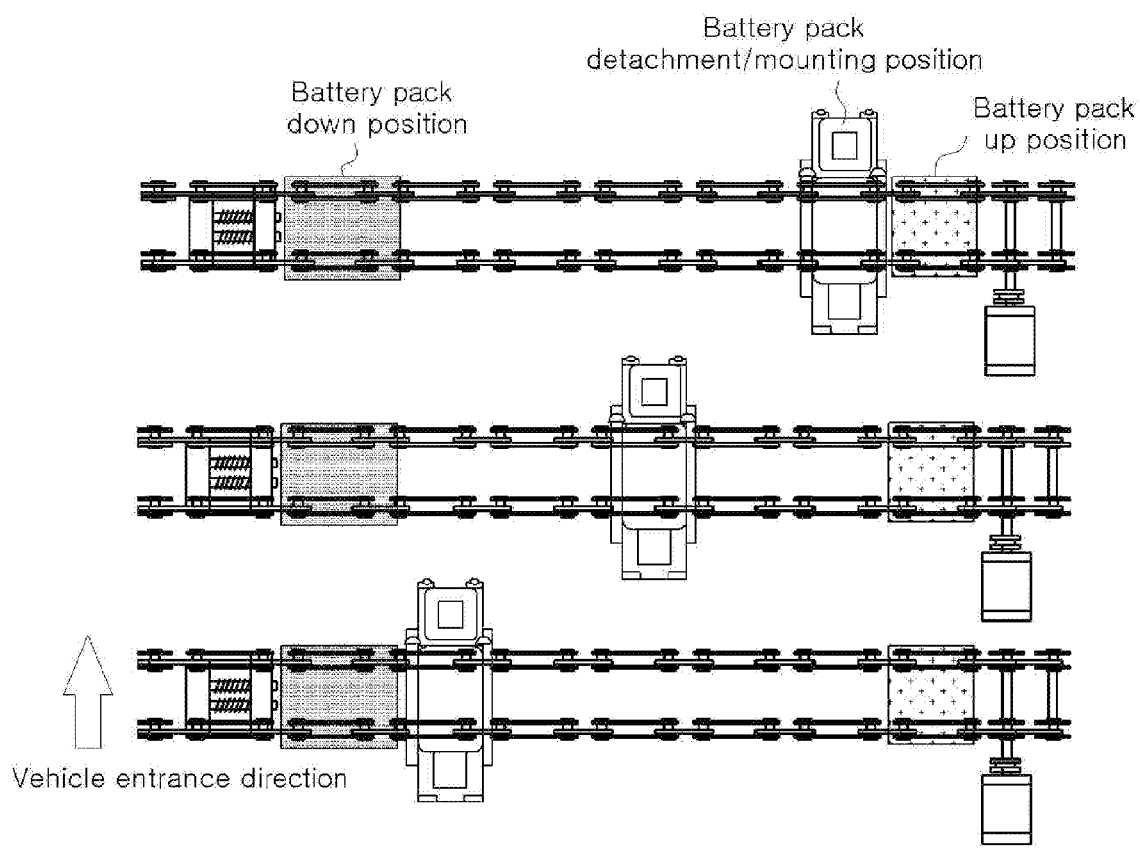
FIG. 7 is a diagram showing a state in which the battery is replaced according to the process diagram of FIG. 6.
Figure 8:
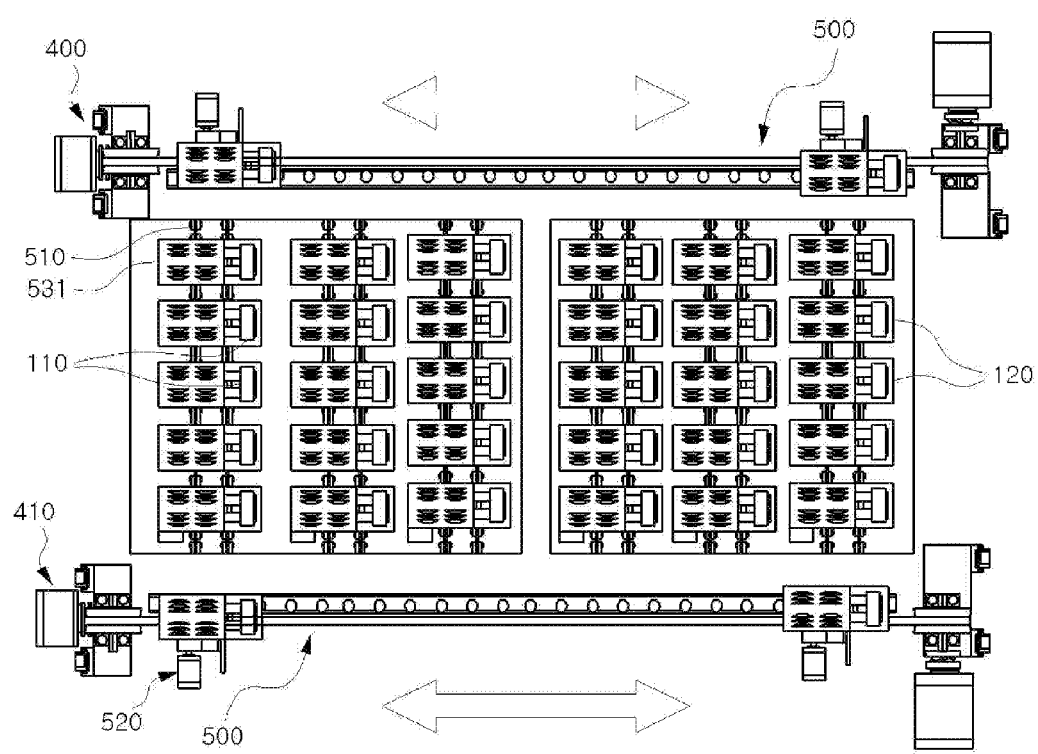
FIG. 8 is a plan view schematically showing a battery storage unit of FIG. 3.
Figure 9:
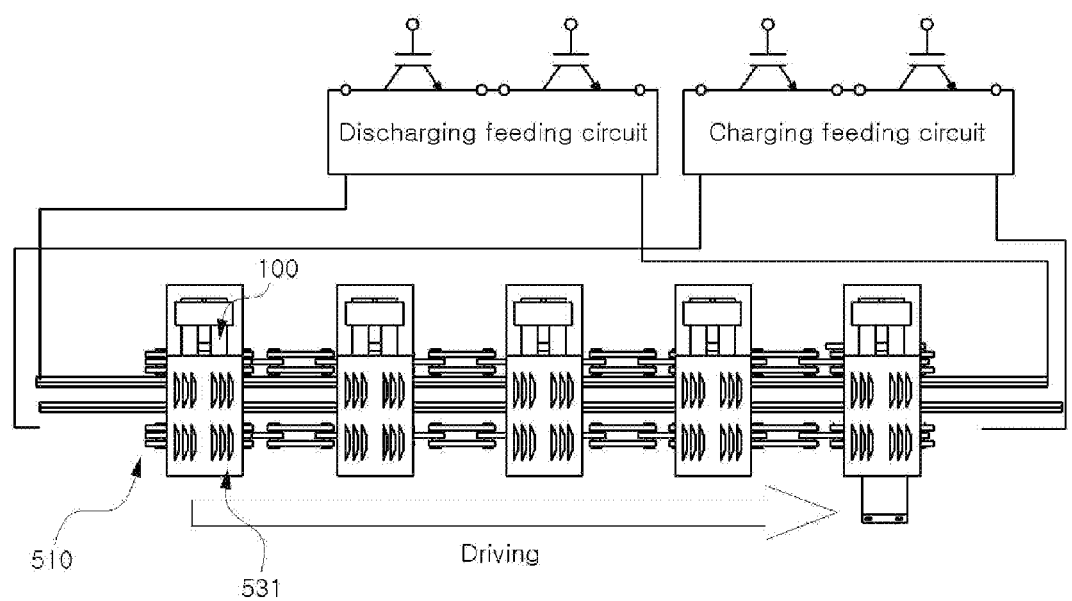
FIG. 9 is a diagram showing a circuit diagram for charging and discharging the battery pack of FIG. 8.
Figure 10:
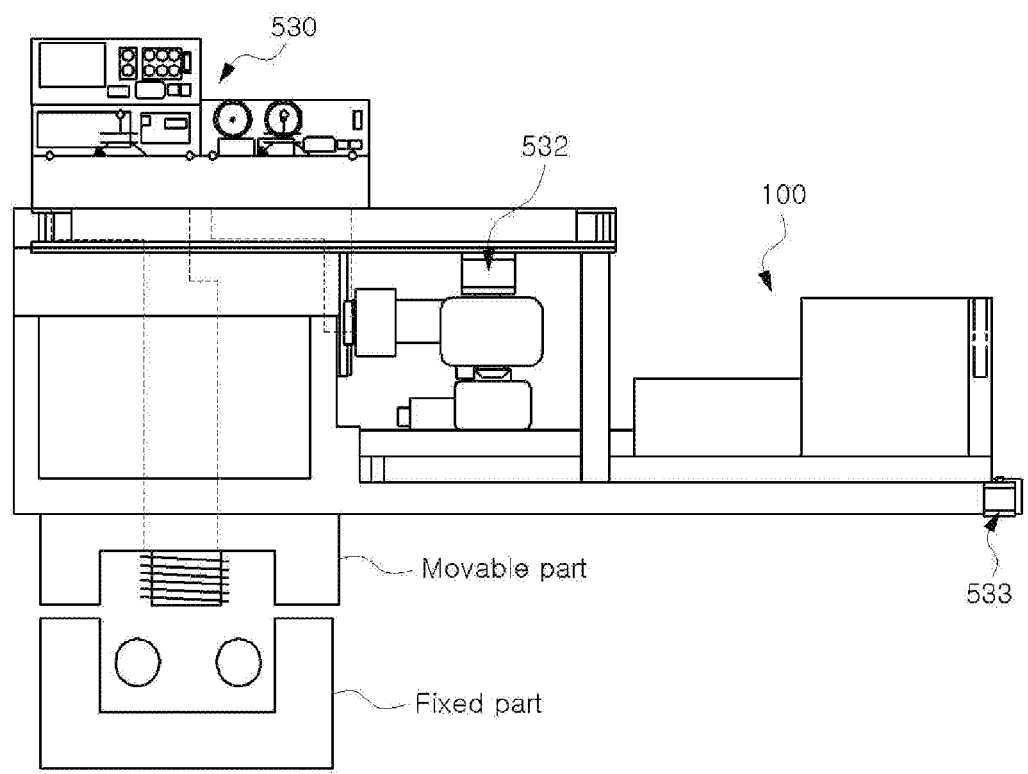
FIG. 10 is a side view showing a state in which the battery pack of FIG. 8 is charged and discharged.
Figure 11:
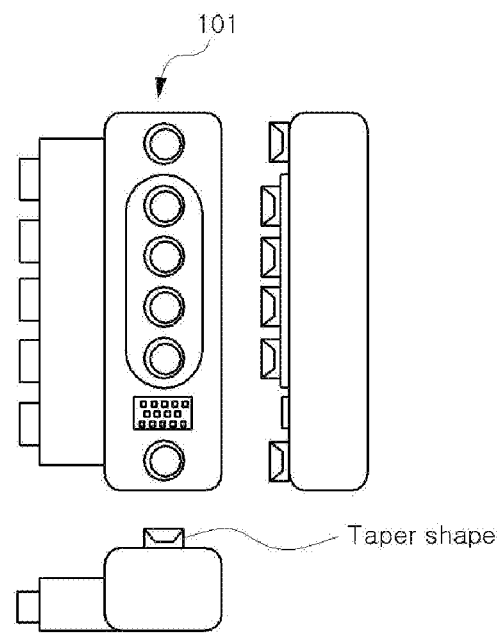
FIG. 11 is a diagram showing a first plug for charging and discharging the battery pack of FIG. 10.
Figure 12:
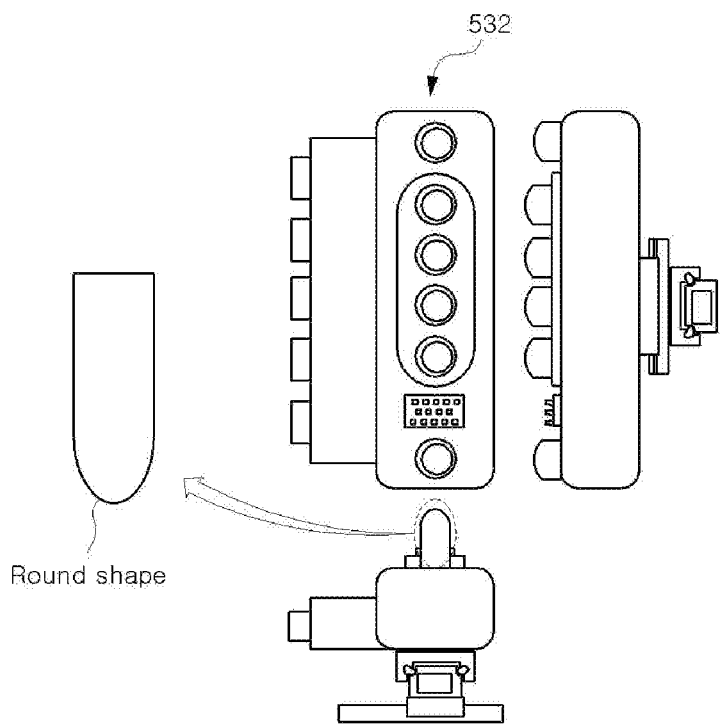
FIG. 12 is a diagram showing a second plug for charging and discharging a charging/discharging device of FIG. 10.
Figure 13:
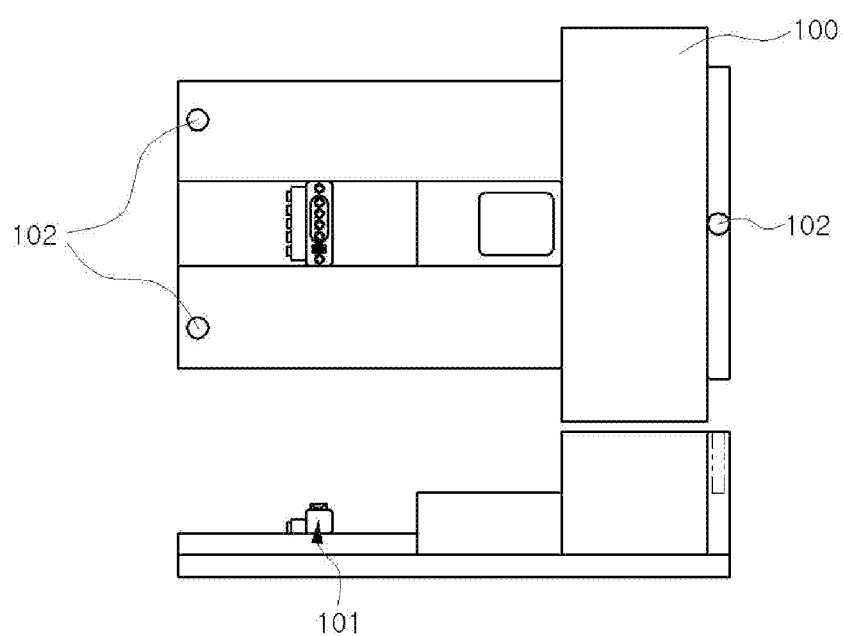
FIG. 13 is a diagram showing the battery pack of FIG. 10.

FIG. 2 is a process diagram schematically showing a battery replacement system for an electric vehicle with an ESS in accordance with an exemplary embodiment of the present invention, FIG. 3 is a side view schematically showing the side of an apparatus for implementing the replacement and charging of a battery in the battery replacement system of FIG. 2, FIG. 4 a process diagram for checking a vehicle that enters the battery replacement system of FIG. 3, FIG. 5 is a diagram for implementing the process diagram of FIG. 4, FIG. 6 is a process diagram for replacing the battery of a vehicle that has entered the battery replacement system of FIG. 3, FIG. 7 is a diagram showing a state in which the battery is replaced according to the process diagram of FIG. 6, FIG. 8 is a plan view schematically showing a battery storage unit of FIG. 3, FIG. 9 is a diagram showing a circuit diagram for charging and discharging the battery pack of FIG. 8, FIG. 10 is a side view showing a state in which the battery pack of FIG. 8 is charged and discharged, FIG. 11 is a diagram showing a first plug for charging and discharging the battery pack of FIG. 10, FIG. 12 is a diagram showing a second plug for charging and discharging a charging/discharging device of FIG. 10, and FIG. 13 is a diagram showing the battery pack of FIG. 10.

The battery pack replacement system for an electric vehicle with an ESS according to the present invention, as shown in FIG. 2, includes a battery pack replacement system and an Energy Storage System (ESS). The replacement system of the present invention is a system including both a replacement system for replacing a discharged battery pack with a battery pack that has been previously charged and stored without charging the battery of an electric vehicle at an electricity charging point and an ESS for sending electricity using the stored battery pack as energy storage purposes. Hereinafter, the battery pack replacement system and the ESS are separately described.

A schematic process for classifying or discarding battery packs by checking the buffer capacities of the battery packs in the system according to the present invention is shown in FIG. 2.

First, a discharged battery pack 100 is detached from an electric vehicle at step S10.

The discharged battery pack 100 is transferred to a charging/discharging line at step S11.

Next, the battery pack 100 is charged and stored at step S12. Here, the battery pack 100 is fully discharged through a discharging feeding circuit and then fully charged through a charging feeding circuit.

The buffer capacity of the charged battery pack 100 is primarily checked at step S13. Here, a first buffer capacity of the battery pack 100 is assumed to be, for example, about 70%, and the battery pack 100 is primarily classified based on the first buffer capacity.

If, as a result of the check, the battery pack 100 is found to have a buffer capacity equal to or greater than the first buffer capacity, the battery pack 100 is classified as a buffer battery pack 110 at step S14. Here, the classified buffer battery pack 110 is managed by the replacement system so that it can replace the discharged battery pack 100.

If, as a result of the check, a battery pack 100 classified as having a buffer capacity smaller than the first buffer capacity, belonging to the primarily classified battery packs 100, is moved to an energy storage-dedicated line at step S15.

Next, a buffer capacity of the primarily classified battery pack 100 is secondarily checked at step S15-1. Here, the buffer capacity of the battery pack 100 is checked. Accordingly, a total amount of charging of all ESS-dedicated battery packs 120 can be calculated by checking the buffer capacity of each of the ESS-dedicated battery packs 120, and the amount of power to be transmitted through a power system line on a peak time when an electric power shortage becomes serious can be calculated.

Next, the secondarily checked battery pack 100 is classified as an ESS-dedicated battery pack 120 at step S16.

The battery pack 100 detached from the vehicle is managed as described above.

Thereafter, a buffer capacity of the ESS-dedicated battery pack 120 is thirdly checked at step S16-1. This is for repeatedly checking a buffer capacity reduced while a corresponding battery pack is used as the ESS-dedicated battery pack 120 in real time. Here, the reduced buffer capacity is about 10 to 20%, and the ESS-dedicated battery pack 120 is secondarily classified based on such a second buffer capacity. Here, if, as a result of the check, the ESS-dedicated battery pack 120 is found to have a buffer capacity equal to or greater than the second buffer capacity, a current storage state is maintained and the corresponding battery pack is used as the ESS-dedicated battery pack 120.

If, as a result of the check, the ESS-dedicated battery pack 120 is found to have a buffer capacity smaller than the second buffer capacity, the battery pack 100 is discarded at step S17.

As described above, the ESS-dedicated battery pack 120 is managed.

As shown in FIG. 3, the battery pack replacement system includes a determination unit for determining the type of battery pack 100 of a vehicle, a replacement unit for detaching a discharged battery pack 100 from the vehicle or mounting a charged battery pack on the vehicle, a charging/discharging unit for charging/discharging and storing the battery pack 100, and a transfer unit for transferring a discharged battery pack 100, detached from the replacement unit, to the charging/discharging unit or transferring the battery pack 100 fully charged by the charging/discharging unit to the replacement unit.

The determination unit determines the type of battery pack 100 to be replaced. More particularly, referring to FIGS. 4 and 5, when a vehicle is entered, the type of battery pack 100 for the vehicle is recognized by reading a car model, and information about the battery pack 100 is transmitted. As described above, the determination unit determines the type of battery pack 100 and sends information about the type of battery pack 100. Thereafter, a fully charged battery pack 100 is prepared for based on the information received from the determination unit. When the vehicle waits at a standby place, a task for replacing a discharged battery pack with a fully charged battery pack is performed.

The determination unit includes a photographing device (e.g., CCTV or a reading camera) 200 for photographing the entered vehicle and determination device (not shown) for determining a car model and the type of battery pack 100 based on data obtained by the photographing device 200. Accordingly, the type of battery pack 100 is determined by photographing the entered vehicle using CCTV or a reading camera and reading a previously inputted car model based on the imaging data. Such information about the battery pack 100 is transmitted to the determination device. Furthermore, if the type of a vehicle is not recognized by reading a car model, the vehicle may be reentered.

Although not shown, the determination unit may determine the type of battery pack 100 based on data read through barcode, Bluetooth, or a sensor attached to the battery pack 100 depending on the type of battery pack 100.

The determination unit may be installed on the lower part of the vehicle because the battery pack 100 is commonly installed on the lower part of the vehicle.

The replacement unit performs a task for replacing a discharged battery pack 100 with a fully charged battery pack 100 in relation to a vehicle. As shown in FIGS. 2 and 6, the replacement unit replaces the discharged battery pack 100 with the fully charged battery pack 100 that has been provided based on the information of the determination unit.

More particularly, when a vehicle is entered, a replacement tool for detaching a discharged battery pack 100 from the vehicle is raised at step S20.

The locking of the discharged battery pack 100 is unclamped using the replacement tool at step S21.

Next, a safety device is opened at step S22.

Furthermore, the discharged battery pack 100 is detached and unloaded at step S23. Here, the discharged battery pack 100 is transferred to a first transfer device 400.

Next, a fully charged battery pack 100 taken over from a second transfer device 410, together with the replacement tool, is raised up at step S24.

The fully charged battery pack 100 is raised up and mounted at step S25.

Next, the safety device is closed at step S26.

Next, the replacement tool is lowered down to the original position at step 27.

Accordingly, the task of replacing the battery pack 100 is completed, and the vehicle is transferred to a safe area. Here, the discharged battery pack 100 detached from the vehicle and mounted on the replacement tool is transferred to the first transfer device 400. Thereafter, the replacement tool is moved by a first conveyance device 310, and thus the fully charged battery pack 100 is delivered to the second transfer device 410 and mounted on the vehicle.

As shown in FIG. 3, the replacement unit includes a replacement device 300 configured to include the replacement tool for replacing the discharged battery pack 100 in a vehicle that stays on the line and the first conveyance device 310 configured to move the discharged battery pack 100 to the transfer unit by moving the replacement device 300, receive the fully charged battery pack 100 from the transfer unit, and transfer the fully charged battery pack 100 to a position of the vehicle on which the fully charged battery pack 100 will be mounted. Here, the battery pack 100 is mounted on the replacement tool and transferred.

The replacement device 300 is mounted on the first conveyance device 310 and is configured to raise up or down the replacement tool for detaching or mounting the battery pack 100.

Furthermore, as shown in FIGS. 3 and 7, the first conveyance device 310 is installed on the lower part of the vehicle and is configured to move the replacement device 300 to a position from which the battery pack 100 is detached, that is, a position on which the battery pack 100 is mounted. More particularly, the first conveyance device 310 moves the replacement device 300 to a battery pack up or down position and a battery pack replacement position by driving a belt or chain on which the replacement device 300 is mounted.

In FIG. 7, the battery pack up position is a position where the discharged battery pack 100 is transferred and delivered to the first transfer device 400, the battery pack down position is a position where the fully charged battery pack 100 is taken over from the second transfer device 410, and the battery pack replacement position is a position where the battery pack 100 is detached from a vehicle or the battery pack 100 is mounted on a vehicle. Here, the first conveyance device 310 transports the replacement device 300 from the battery pack replacement position to the battery pack down position, from the battery pack down position to the battery pack up position, and from the battery pack up position to the battery pack replacement position.

As shown in FIGS. 3 and 8, the transfer unit includes the first transfer device 400 configured to mount the discharged battery pack 100 detached from the replacement unit and transported to the first conveyance device 310 thereon, raise the discharged battery pack 100, and transfer the discharged battery pack 100 to the second conveyance device 500 of the storage unit and the second transfer device 410 configured to take a fully charged battery pack 100 from the second conveyance device 500 and transfer the fully charged battery pack 100 to the first conveyance device 310 of the replacement unit.

Here, each of the first and the second transfer devices 400 and 410 may be formed of an elevator so that the battery pack 100 mounted on the elevator is raised up and down and transferred to a position where the battery pack 100 will be stored. Furthermore, each of the first and the second transfer devices 400 and 410 may be configured to move the battery pack 100 from the first transfer device 400 to the second conveyance device 500 or from the second conveyance device 500 to the second transfer device 410 by raising the battery pack 100 up or pushing or pulling the battery pack 100.

As shown in FIGS. 3 and 8, the storage unit is divided into an area in which a plurality of stages is included so that battery packs can be stored depending on the type of battery pack 100 and in which buffer battery packs 110, each having a buffer capacity higher than a primary buffer capacity and replacing the discharged battery pack 100 for a vehicle, are stored and an area in which ESS-dedicated battery packs 120, each having a buffer capacity smaller than the primary buffer capacity and used for an ESS, are stored.

Furthermore, as shown in FIGS. 8 to 10, the storage unit includes the second conveyance device 500, a third conveyance device 510, a transfer device 520, and a charging/discharging device 530.

First, as shown in FIG. 8, the second conveyance device 500 is configured to take over the battery pack 100 from the first transfer device 400, transfers the battery pack 100 to the third conveyance device 510, takes over the battery pack 100 from the third conveyance device 510, and transfers the battery pack 100 to the second transfer device 410.

Furthermore, the second conveyance device 500 is configured to transfer the battery packs 100 that are classified into the buffer battery packs 110 and the ESS-dedicated battery packs 120 to corresponding areas. That is, the second conveyance device 500 performs a function of delivering the battery pack 100 to the third conveyance device 510 and a function of conveying the battery pack 100 having a buffer capacity smaller than a primary buffer capacity of about 70%, belonging to the battery packs 100 in the buffer battery pack (110) area, as the ESS-dedicated battery pack 120 and conveying the battery pack 100 having a buffer capacity smaller than a secondary buffer capacity of about 10-30%, belonging to the ESS-dedicated battery packs 120, in order to discard the battery pack 100. Here, the battery pack 100 and a charging/discharging connector 531 are connected to and mounted on the second and the third conveyance devices 500 and 510.

Furthermore, as shown in FIGS. 8 and 9, the third conveyance device 510 is configured to move the battery pack 100 from the first transfer device 400 to the second transfer device 410 in order to take over the battery pack 100 from the second conveyance device 500 on the first transfer device (400) side and transfer the battery pack 100 to the second conveyance device 500 on the second transfer device (410) side.

The third conveyance device 510 is configured to move a belt or chain on which the battery pack 100 and the charging/discharging connector 531 are mounted to a power source. Furthermore, the charging/discharging connector 531 and the discharging feeding circuit are connected and the charging/discharging connector 531 and the charging feeding circuit are connected in the third conveyance device 510 so that electricity is applied to the charging/discharging connector 531 and the discharging/charging feeding circuits.

That is, the battery pack 100 and the charging/discharging connector 531 mounted on the second conveyance device 500 are not electrically connected. Here, the charging of the battery pack 100 through the discharging feeding circuit and the charging feeding circuit is performed wirelessly, and an interval between the battery pack 100 and a movable part maintains 10 mm 3% as in FIG. 10 in order to maximize power transmission efficiency.

Furthermore, the transfer device 520 may be configured to mount the battery pack 100, mounted on the second conveyance device 500 on the first transfer device (400) side, on the third conveyance device 510 by pushing the battery pack 100 or configured to mount the battery pack 100, mounted on the third conveyance device 510, on the second conveyance device 500 on the second transfer device (410) side by pulling the battery pack 100. The transfer device 520 may be configured to transfer the battery pack 100 by raising the battery pack 100 up.

The charging/discharging device 530 includes the charging/discharging connector 531 configured to have a second plug 532 connected to the first plug 101 of the battery pack 100, the discharging feeding circuit and the charging feeding circuit configured to rapidly discharge or rapidly charge the battery pack 100 through the charging/discharging connector 531, and an inverter configured to convert commercial power into power for charging.

Furthermore, the charging/discharging device 530 is configured to control power so that the battery pack 100 detached from the vehicle and mounted on the third conveyance device 510 is rapidly discharged through the discharging feeding circuit or rapidly charged through the charging feeding circuit. More particularly, as shown in FIGS. 9 to 13, when the battery pack 100 is conveyed from the first transfer device 400 to the second conveyance device 500, the second plug 532 of the charging/discharging device 530 is connected to the first plug 101 of the battery pack 100.

Thereafter, when the battery pack 100 is moved and mounted on the third conveyance device 510, the battery pack 100 is rapidly discharged and fully discharged by the discharging feeding circuit and then rapidly charged and fully charged by the charging feeding circuit. Here, the terminal of the first plug 101 has a taper shape as shown in FIG. 11 and the terminal of the second plug 532 has a round shape as shown in FIG. 12, so that the first plug 101 and the second plug 532 are smoothly connected. In another embodiment, the terminal of the first plug 101 may have a round shape and the terminal of the second plug 532 may have a taper shape.

The charging/discharging device 530 further includes a battery pack lock 533 for fixing the battery pack 100 in the state in which the first plug 101 and the second plug 532 are connected. Furthermore, reference holes 102 for alignment are formed at the front and rear parts of the battery pack 100 as shown in FIG. 13. The first plug 101 and the second plug 532 are aligned through the reference holes 102.

Furthermore, the charging/discharging device 530 can determine a buffer capacity of the battery pack 100 based on the primary and secondary buffer capacities of the battery pack 100 and determine whether to use the battery pack 100 as the buffer battery pack 110 or the ESS-dedicated battery pack 120 or discard the battery pack 100 depending on a buffer capacity of the battery pack 100.

As described above, those skilled in the art to which the present invention pertains will understand that the present invention may be implemented in various detailed forms without changing the technical spirit or essential characteristics of the present invention. It will be understood that the above-described embodiments are illustrative and not limitative from all aspects. The scope of the present invention is defined by the appended claims rather than the detailed description, and the present invention should be construed as covering all modifications or variations derived from the meaning and scope of the appended claims and their equivalents.

What is claimed is:

1. A system equipped with a replacement system for replacing a battery pack for an electric vehicle and an Energy Storage System (ESS), the system comprising:
   a determination unit for determining a kind of battery pack of the vehicle;
   a replacement unit for detaching a discharged battery pack from the vehicle or mounting a battery pack on the vehicle;
   a charging/discharging unit for charging/discharging and storing the discharged battery pack; and
   a transfer unit for conveying the discharged battery pack, detached from the replacement unit, to the charging/discharging unit or conveying the battery pack, fully charged by the charging/discharging unit, to the replacement unit,
   wherein the replacement unit comprises:
   a replacement device including a replacement tool for replacing the discharged battery pack in the vehicle; and
   a first conveyance device configured to transfer the discharged battery pack, mounted on the replacement tool, to the transfer unit and transfer the fully charged battery pack, taken over from the transfer unit and mounted on the replacement tool, to a position on which the fully charged battery pack is to be mounted,
   wherein the transfer unit comprises:
   a first transfer device configured to move up and down and transfer the discharged battery pack, taken over from the replacement unit, to a storage unit; and
   a second transfer device configured to transfer the fully charged battery pack, taken over from the storage unit, to the transfer unit,
   wherein the first transfer device transfers the discharged battery pack, delivered by the first conveyance device, to the storage unit, and wherein the storage unit comprises:
a second conveyance device configured to store the battery pack depending on the kind of battery pack and take over the transfer unit from the discharged battery pack;
a third conveyance device configured to take over the discharged battery pack from the second conveyance device, store the discharged battery pack, and transfer the discharged battery pack to the second conveyance device; and
a charging/discharging device configured to charge the discharged battery pack transferred to the third conveyance device.

2. The system of claim 1, wherein:
the determination unit comprises a photographing device including a CCTV or a reading camera for photographing the vehicle and to determine the kind of battery pack by reading a car model and a determination device configured to determine the car model and the kind of battery pack using data received from the photographing device, or
the determination unit comprises a determination unit installed on a lower part of the vehicle and configured to determine the kind of battery pack using data received through barcode, Bluetooth, or a sensor attached to the battery pack depending on the kind of battery pack.

3. The system of claim 1, wherein the storage unit further comprises a transfer device configured to transfer the discharged battery pack from the second conveyance device to the third conveyance device or transfer the fully charged battery pack, stored in the third conveyance device, to the second conveyance device.

4. The system of claim 1, wherein the second conveyance device transfers the discharged battery pack from the first transfer device to the third conveyance device and transfers the fully charged battery pack, stored in the third conveyance device, to the second transfer device.

5. The system of claim 1, wherein:
the first conveyance device moves a belt or chain on which the replacement device is mounted to a power source, and
the second and the third conveyance devices move a belt or chain on which the battery pack is mounted to the power source.

6. The system of claim 1, wherein the charging/discharging device comprises:
a charging/discharging connector including a second plug connected to a first plug of the battery pack;
a discharging feeding circuit and a charging feeding circuit configured to discharge and charge respectively the discharged battery pack through the charging/discharging connector; and
an inverter configured to convert commercial power into power for charging.

7. The system of claim 6, wherein the discharging feeding circuit and the charging feeding circuit and the charging/discharging connector are electrically connected in the third conveyance device.

8. The system of claim 6, wherein the first plug and the second plug have a taper shape and a round shape, respectively, or a round shape and a taper shape, respectively.

9. The system of claim 6, wherein the charging/discharging device further comprises a battery pack lock for fixing the battery pack.

10. The system of claim 6, wherein the charging/discharging device determines whether to use the battery pack as a buffer battery pack that replaces the discharged battery pack or as an ESS-dedicated battery pack that is charged and stored depending on a buffer capacity of the battery pack.

11. The system of claim 6, wherein a plurality of reference holes for connecting the first plug and the second plug is formed in front and rear parts of the battery pack.

* * * * *